United States Patent

Burgers

[11] 4,093,056
[45] June 6, 1978

[54] SINGLE REVOLUTION MECHANISM

[75] Inventor: Gerrit Burgers, Amstelveen, Netherlands

[73] Assignee: International Business Machines Corporation, Armonk, N.Y.

[21] Appl. No.: 748,865

[22] Filed: Dec. 10, 1976

[30] Foreign Application Priority Data

Jun. 30, 1976 Netherlands .................. 7607249

[51] Int. Cl.² ................................................ F16D 71/00
[52] U.S. Cl. ................................ 192/127; 74/112; 74/206; 101/235; 192/142 R; 192/149; 271/265; 271/266; 271/274
[58] Field of Search ............. 192/127, 142 R, 148, 192/149; 74/112, 113, 206, 207, 208, 209, 213; 271/265, 266, 272, 273, 274; 101/235, 245

[56] References Cited

U.S. PATENT DOCUMENTS

| | | | |
|---|---|---|---|
| 2,561,447 | 7/1951 | Miller | 74/213 |
| 2,786,559 | 3/1957 | Sherwood | 74/209 X |
| 2,876,005 | 3/1959 | Eash | 74/213 |
| 2,909,069 | 10/1959 | MacDonald | 74/210 X |
| 3,037,447 | 6/1962 | Gonzalez et al. | 101/235 X |
| 3,038,348 | 6/1962 | Stovold et al. | 74/209 |
| 3,495,693 | 2/1970 | Limberger | 192/148 |

*Primary Examiner*—Allan D. Herrmann
*Attorney, Agent, or Firm*—Edward H. Duffield

[57] ABSTRACT

A single revolution mechanism is disclosed in which a feed roll is mounted on a print lever which is attached rotatably to a pivot. By rotating the lever, the feed roll can be brought into contact with an external driving shaft. The feed roll is coupled to a ratchet mechanism comprising a pawl and ratchet. The pawl is engaged with a spring urged pressure lever so that when the feed roll is driven, the ratchet pushes itself away from the second lever to latch the print lever and roll in the operative position during a full revolution. After performing the revolution, the print lever reengages the ratchet to unlatch the device from the driving roll in preparation for another actuation.

6 Claims, 6 Drawing Figures

SINGLE REVOLUTION MECHANISM

FIELD OF INVENTION

The invention relates to a mechanism for performing a predetermined rotation, specifically one full revolution, and to application of such a device in an automatic printing device.

PRIOR ART

Functional units per se, wherein one or more revolutions are derived from a continuously rotating shaft, are generally known in the prior art. They find extensive application in precision apparatus. An example is the known helical spring clutch, effecting the coupling between two shafts. The helically wound spring clamps around the two shafts and can be disengaged or engaged by moving a free end of the spring with an electromagnetically operated pawl.

Another known means for deriving an intermittent movement from a continuously rotating shaft is the generally known Geneva cross.

One out of many potential applications of prior single revolution mechanisms is in automatic printing devices. These printing devices are used for repetitively applying the same mark to a relatively large number of documents to indicate the fact that the document concerned has been processed. In the process, the printing device can apply to each of the documents in indication of the nature of the processing, firm name, date or other information.

Generally, these automatic printing devices are provided with a cylindrical body having a printing stamp fitted thereto. They usually perform a single revolution for each printing operation, during which the printing plate is inked and brought into contact with the document to be printed.

Examples of such automatic printing devices are mentioned in U.S. Pat. Nos. 2,237,269 and 2,743,671. According to U.S. Pat. Nos. 2,237,269, a single revolution mechanism is obtained by electromagnetically releasing a pawl which drops into a ratchet wheel to effect coupling. The pawl is detained, after completion of a revolution, by the armature of a magnet and disengaged from the ratchet wheel to disengage the mechanism.

According to U.S. Pat. No. 2,743,671 a single revolution mechanism is obtained by means of a shaft driven by a friction clutch. The shaft is provided with a rod perpendicularly mounted thereon, one end of which is detained by a pawl. The rod is released for performing a half revolution by temporarily withdrawing the pawl from the path of said rod by means of a magnet coil.

A drawback of the devices mentioned is that the single revolution mechanism applied therein is mounted on and around the driving shaft. This results in the printing mechanism not being present as an individual entity but being incorporated in the aggregate of the machine. If is often desirable to secure a device provided with a single revolution mechanism detachably in a machine as a separate entity. Both in producing and repairing the various parts of a machine it is a great advantage when these different parts can be manufactured and replaced separately. It is often desirable to add certain parts to a machine or to omit these, dependent on the wish of the user, as in the case of the printing device disclosed herein as an application of the present invention. In this connection it is important that such a device can be added without fundamental modifications in the machine.

Objects

It is an object of the invention to provide an improved single revolution mechanism adapted to be coupled to an external driving shaft without further provisions.

A further object of the invention is to provide an improved single revolution mechanism wherein, under control of an electrical signal, a feed roll driven by electromagnetic means is brought into contact with an external, continuously driven shaft and latched in this operative position with mechanical means and, after performing one revolution, is released again in a position corresponding with the home position.

A further object of the invention is to provide an improved single revolution mechanism having a feed roll which is pressed against an external shaft, and which is provided with a pawl mechanism for taking over the pressure force of the electromagnetic means and for mechanically latching the device in the operative position during a full revolution.

It is a further object of the invention to provide an improved device which can be driven mechanically and which is provided with a single revolution mechanism, said device being adapted to be detachably mounted in a larger unit in simple fashion.

Summary

According to the invention, the foregoing objects are realized by providing in a single revolution mechanism, a feed roll mounted on a print lever disposed rotatably about a pivot point so that the feed roll can be brought into contact with an external driving shaft, said feed roll being coupled to a ratchet wheel. The ratchet wheel is engaged with a spring urged second pressure lever so that, when the feed roll is driven, the ratchet wheel pushes itself away from the second lever thus latching the mechanism in the operative position of the device during a full revolution. After performing the revolution the print lever reengages the ratchet wheel to unlatch the device.

The details of the invention will be described hereinafter, with reference to the following drawings.

Figure 3:
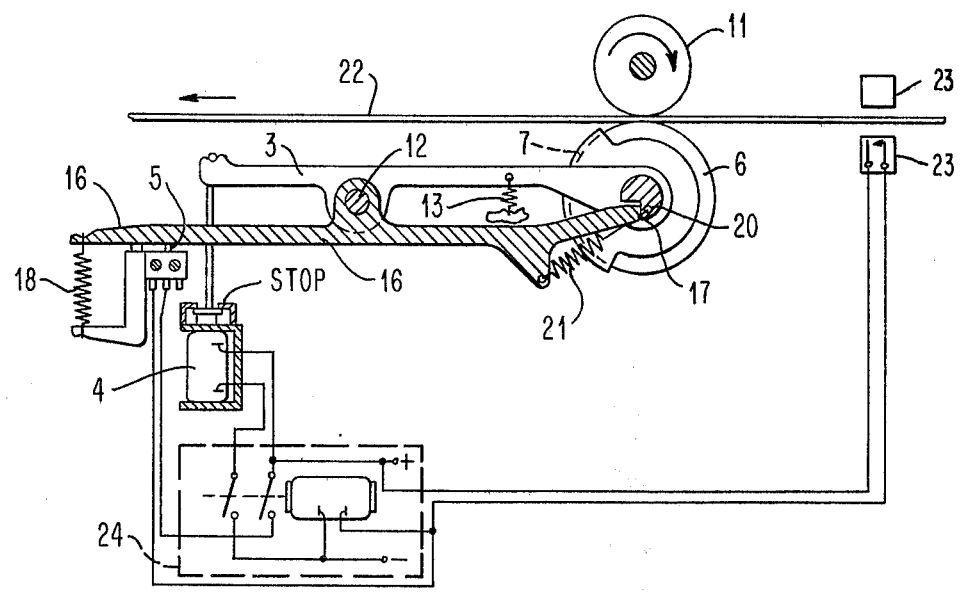
FIG. 3 is a diagrammatic representation of the essential elements of the printing device and the single revolution mechanism according to the invention.
Figures 4A, 4B, 4C:
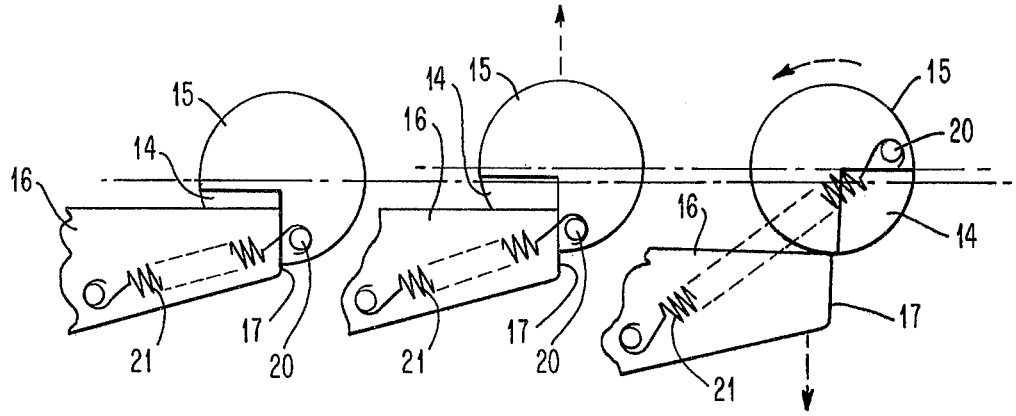

FIGS. 4A, B, and C show different positions of the pawl mechanism of FIG. 3 during the performance of a single revolution.

For the sake of completeness and clarity, the apparatus in the figures is intended for use in a machine for processing bills and checks, wherein a removable automatic printing device, provided with the single revolution mechanism according to the invention may be mounted. The function of the printing mechanism is to provide each bill or check processed by the machine with a mark. Said mark may indicate, for example, that the bill or check concerned has been processed by the machine. The mark may also be an indication as to the type of processing, the firm's name, or another distinguishing mark. The brief description of this machine for document processing which will follow hereinafter, however, is in no respect meant to be a limitation of the range of applications of the single revolution mechanism to be described hereinafter.

For further details of such a document processing device, reference is made to the co-pending Dutch application for letters patent of the same date, entitled "Document Processing Device" (IBM Docket NE9-76-001). For the present invention it is important that the automatic printing device is detachably mounted in the document processing device. This printing device provides every document carried along the printing or endorsing station with a mark indicative of the fact that the document has been processed by the machine.

Figure 1:
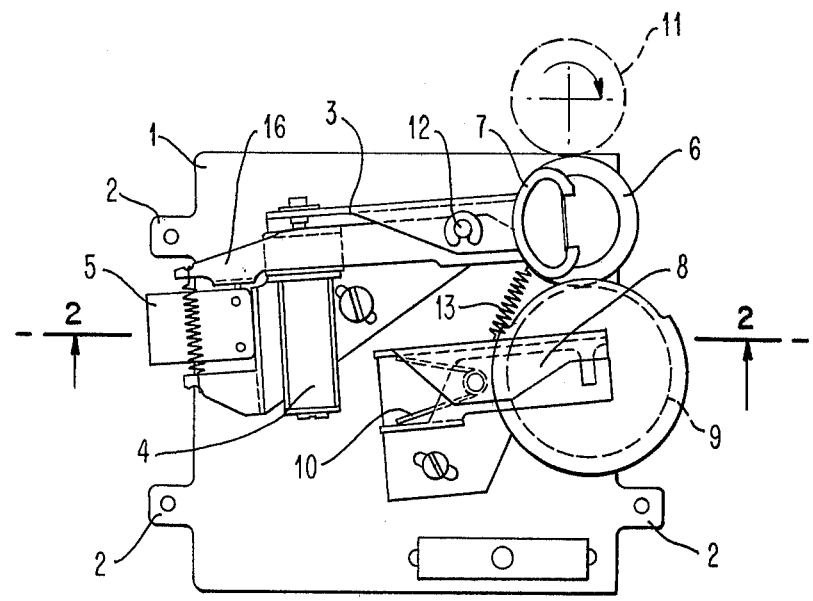
FIG. 1 shows the automatic printing device, provided with the single revolution mechanism according to the invention.
Figure 2:
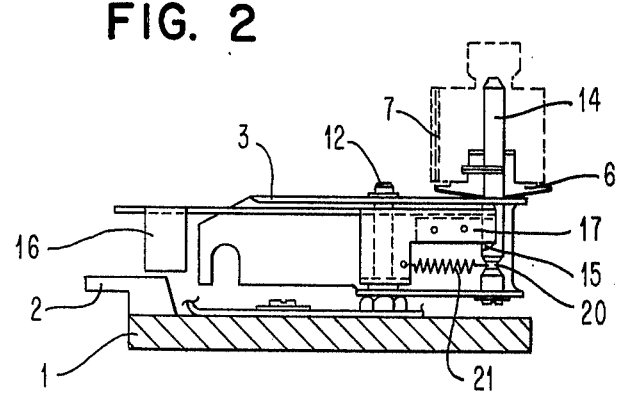
FIG. 2 shows a section of the printing device of FIG. 1 along the line 2—2.

FIGS. 1 and 2 show the printing device for the abovementioned document processing device. The various parts of the printing device are fitted on a base plate 1, secured in the machine by means of integrally cast connecting strips 2. Plate 1 has a lever system 3 with a magnetic coil 4 and microswitch 5 attached thereto, a feed roll 6 and a printing stamp 7 being rotatably mounted at one end of the lever system 3. The lever system 8 supports an inking roll 9, held in contact with the print feed roll 6 by a spring 10.

By means of bolts, plate 1 is mounted in the document processing device so that feed roll 6 is disposed opposite the continuously rotating drive roll 11. Feed roll 6 may be pressed against the drive roll 11 by the lever system 3 if there is a document detected between the two rolls 6 and 11 by a document detection device. During such action, the feed roll 6 completes a full revolution, during which the printing stamp 7 is first brought into contact with inking roll 9 and subsequently performs a printing operation upon the document. The embodiment and operation of the device will be further described with reference to FIg. 3, but for the moment it will be evident that the printing device is a separate unit, disposed opposite the continuously driven drive roll 11 in the machine.

FIG. 3 is a simplified diagrammatic representation of the essential elements of the printing device and the single revolution mechanism. External shaft 11 forms part of the processing machine and is continuously driven clockwise from the motor in this machine. The printing device comprises a print lever 3, rotatably fitted on a shaft 12 mounted on the base plate of the printing device, and having one end connected to the armature of electromagnet 4. The other end of lever 3, drawn by a spring 13 against a stop formed by the armature of magnet 4, is provided with a rotatable shaft 14, having pressure roll 6 fitted thereto. Beside pressure roll 6 and connected thereto is a cylindrical body, whose printing stamp 7 forms a raised portion. A recess in the form of a 90° segment of arc constitutes a camming disc (equivalent to a ratchet wheel) 15 in shaft 14 of pressure roll 6, the section of the disc covering a three quarter circle segment.

Shaft 12 has a second pressure lever 16 pivotably mounted thereon, one end of which is provided with a stop (equivalent to a pawl) 17 cooperating with camming disc (ratchet wheel) 15. The other end of lever 16 is connected to a spring 18, keeping this end of lever 16 in the rest state pressed against a stop 19 rigidly secured to the base plate.

In the rest state of the printing device, the switching pin of the microswitch 5, mounted on the rigid stop 19, is held depressed, so that the contacts of this microswitch are connected. Shaft 14 has, beside the recess formed by the 90° segment 15, an eccentric portion 20, which is under the tension of a spring 21 so that in the rest state printing stamp shaft 14 accurately occupies the same position at all times. Spring 21 and eccentric 20 provide a clockwise torque stop 17. Cam surface 15 provide a counterclockwise stop.

In transport path 22 for the documents 22 to be processed, is a detection device 23, cooperating with a control device 24 and microswitch 5, upon energization of electromagnetic device 4. Upon the passing of a document 22, the printing device is to perform a work cycle. The detection device 23 may be a mechanical or an optical device, preferably in such an embodiment that it supplies a signal of short duration or briefly closes a contact upon passing the back of a document 22. Such a detection device 23, which is in itself known, may consist of two mechanical detection devices placed closely together, the contacts whereof are series connected so that a signal is supplied when, in the direction of movement of the documents 22, the contacts of the second detection device 23 are closed and those of the first opened, i.e., when the document has passed the first detection device 23 but has not yet passed the second one.

During operation the contacts of the detecting device 23 are briefly closed when the back of a document passes detecting device 23 in the transport path. This results in a signal which is applied to control circuit 24. For the sake of a simple explanation of the function of control device 24, a relay circuit is represented in this device which performs the desired function, but in embodying the said control circuit 20 also more complicated electronic circuits may be applied, as will be mentioned hereinafter.

During the brief energization of the relay in control circuit 24 by detection device 23, electromagnetic device 4 is energized by way of a first contact of the relay, said relay holding, after opening of the contacts of detection device 23, via its own second contact and the closed contacts of microswitch 5.

As already observed, it is preferable to apply a more complicated electronic circuit in a practical embodiment of control circuit 24, which, in response to the signal of detecting device 23, determines the time of energization of electromagnetic device 4 in dependence on a number of adjustable parameters, such as the desired position of the printing stamp impression on the document to be processed, the distance between detecting device 23 and the printing stamp, and the speed at which the documents are transported. Such a variation of the control device is in the compass of a man skilled in the art and for the purpose of the present specification further details thereof would not seem necessary.

As soon as the electromagnet 4 is energized, the armature thereof is attracted; as a result whereof, lever 3 performs a counterclockwise angular rotation and pressure roll 6 is brought into contact with driving roll 11. During this movement of lever 3, camming disc 15 moves in respect to stop 17, as is clearly represented in FIGS. 4A and B, but the angular rotation of lever 3 is not so large that camming surface 15 gets entirely clear of stop 17. The rotating movement is imparted to pressure roll 6 when it contacts roll 11 and the intermediate document 22 is carried off by the two rolls. Camming disc 15 likewise rotates counterclockwise, and, as evident from FIGS. 4B and C, and during the rotation camming surface 15 urges stop 17 downward. As a result, lever 16 undergoes a clockwise angular rotation and spring 18 is tensioned and the contact of microswitch 5 is broken. The result is that the relay in control device 24 is deenergized and the energization of coil 4 is terminated. Under the influence of spring 18, stop 17 urges camming surface 15, and with it shaft 14, upwards, so that the pressure of pressure roll 6 against driving roll 4 is maintained. The contact pressure between the rolls 11 and 6, which was initially effected by the electromagnet, has, as a result hereof, been mechanically taken over and latched by camming disc 15, lever 16 and spring 18.

Upon further rotation of roll 6 the counterclockwise rotating printing stamp 7 is first brought into contact with inking roll 9 (see FIG. 1) and subsequently into contact with the document in path 22, the mark being applied to the document. After a complete revolution is performed, stop 17 reenters the recess in camming disc 15 and, under the influence of spring 18, spring 21 (FIGS. 5A-C) brakes the rotation of the printing stamp shaft and detains this shaft in the rest state. Microswitch 5 is closed again and the cycle has been completed. This resets the device, which is now ready for processing the following document.

The foregoing presents an application of a single revolution mechanism in a printing device, adapted to be driven by an external shaft and to be detachably mounted in a bigger machine for automatically stamping documents. An important advantage of this device is that the printing mechanism may be embodied and mounted as a separate entity, without affecting other parts of the document processing machine wherein the printing machine is fitted. It is only necessary to secure the printing device in a suitable place opposite a driven shaft. It will be evident that the application of the present single revolution machanism is not limited to printing devices in document processing units, but that this single revolution mechanism can be applied as a functional unit in any device wherein an intermittent single revolution is to be carried out.

What is claimed is:

1. A single revolution mechanism, wherein a coupling between a shaft to be driven and a continuously rotating shaft is effected and latched, and after performing a predetermined rotation of the shaft to be driven, the latching and the coupling with said continuously rotating shaft are automatically interrupted, comprising: a feed roll (6) rotatably mounted at one end of a first lever (3); means (4) for bringing said first lever from the rest position to an operative position in which operative position said feed roll is in a proper position to be driven by frictional contact with a continuously rotating shaft (11); and, further means for mechanically latching said lever and feed roll in the operative position independently of said means (4) and means for eliminating this mechanical latching after a predetermined rotation of said feed roll.

2. Single revolution mechanism as described in claim 1 wherein: said first lever is pivotably fitted on a shaft (12) and is held in the rest state by spring force (13), said means (4) being electromagnetic means, cooperating with the other end of said lever (3) and causing, in response to an electrical signal, an angular rotation of said lever, as a result whereof said lever moves from the rest state to the operative state; and means (5) for switching off said electromagnetic means upon the mechanical latching of the device.

3. A single revolution mechanism according to claim 1 wherein: said feed roll (6), which is rotatably mounted on said first lever, is rigidly secured to a camming disc (15) comprising a recess, engaged by a stop (17) of a second lever (16) to latch said feed roll in the rest state, said camming surface being disengaged from said second lever as a result of the movement of said first lever (3) and the rotation of said feed roll, respectively.

4. A single revolution mechanism according to claim 2 wherein: said feed roll (6), which is rotatably mounted on said first lever, is rigidly secured to a camming disc (15) comprising a recess, engaged by a stop (17) of a second lever (16) to latch said feed roll in the rest state, said camming surface being disengaged from said second lever as a result of the movement of said first lever (3) and the rotation of said feed roll, respectively.

5. A single revolution mechanism as described in claim 4, wherein: said second lever (16) is pivotably mounted and is held engaged with the recess in the camming surface (15) under the influence of spring force (18, 21), said camming surface being caused to rotate with said feed roll upon reaching said operative position and causing said second lever to pivot against the force of said springs (18, 21), in order to latch said first lever and said feed roll in said operative position.

6. Single revolution mechanism as described in claim 5, wherein: said second lever (16) rests against a stop (19) in said rest state, said camming surface being partially lifted out of engagement with said stop (17) of said second lever upon its transition from said rest state to said operative state during the movement of said first lever, whereupon said camming surface, in its operative state, exerts a force on said stop (17) or said second lever due to its simultaneous rotation, in consequence whereof said second lever undergoes an angular displacement which is opposed to that of said first lever, for maintaining and latching, under spring force, the pressure with which said feed roll is urged against said continuously rotating shaft.

* * * * *